United States Patent [19]

Bailey

[11] Patent Number: 4,845,909
[45] Date of Patent: Jul. 11, 1989

[54] FIXING AND COUPLING OF PANELS AND CLADDING

[75] Inventor: Brian A. Bailey, Tewin Wood, England

[73] Assignee: Cormid Limited, Hertfordshire, England

[21] Appl. No.: 235,008

[22] Filed: Aug. 22, 1988

[30] Foreign Application Priority Data

Aug. 21, 1987 [GB] United Kingdom ............... 8719796

[51] Int. Cl.$^4$ ............................................. E04B 2/96
[52] U.S. Cl. ................................. 52/235; 52/127.12; 52/510
[58] Field of Search ............... 52/127.12, 235, 508, 52/768, 767; 411/429, 349, 549, 553; 29/526.1

[56] References Cited

U.S. PATENT DOCUMENTS

| | | | |
|---|---|---|---|
| 2,347,581 | 4/1944 | Turner | 411/349 X |
| 2,931,471 | 4/1960 | Howard | 411/349 X |

FOREIGN PATENT DOCUMENTS

| | | | |
|---|---|---|---|
| 0144926 | 11/1984 | European Pat. Off. | |
| 0180837 | 10/1985 | European Pat. Off. | |
| 2364224 | 11/1975 | Fed. Rep. of Germany | 52/235 |
| 2750961 | 6/1979 | Fed. Rep. of Germany | |
| 3527224 | 2/1987 | Fed. Rep. of Germany | |
| 2568290 | 7/1984 | France | 52/235 |
| 639454 | 11/1983 | Switzerland | |
| 2188075 | 9/1987 | United Kingdom | |

*Primary Examiner*—David A. Scherbel
*Assistant Examiner*—Jerrold D. Johnson
*Attorney, Agent, or Firm*—Merchant, Gould, Smith, Edell, Welter & Schmidt

[57] ABSTRACT

The outer cladding of a web of a building is provided by a plurality of panels extending vertically and horizontally thereof in an array. The panels are formed along a pair of opposite vertically extending edge regions with sheet metal flanges each provided with at least one dog-legged cut-out leading to a circular section in which a screw threaded rotatable member is located. The rotatable member has passed up through a narrow vertical section of the cut-out owing to its then being oriented so that parallel flat surfaces offering a narrow cross-section are vertical and has been rotated to extend across the diameter of the circular section and then bite into the sheet metal. The panel is rendered immobile in this way and thus largely incapable of generating noise as a result of absence of capacity for movement. The flanges and rotatable members can similarly be used wherever it is desired to fix a panel or to couple two or more panels together.

9 Claims, 2 Drawing Sheets

FIXING AND COUPLING OF PANELS AND CLADDING

This invention relates to the fixing of panels and to the coupling together of panels and more particularly to the attachment of rain screen cladding to building constructions.

BACKGROUND OF THE INVENTION

An established practice in the building art, particularly where rapid building techniques are concerned, is to apply rain screen cladding to a building construction whose exterior is built up from concrete, blocks, or bricks whose external surfaces are then covered with a weatherproof membrane in which openings are made only where for example windows and doors are to be provided. The rain screen cladding in its simplest form is built up from an array of panels disposed over the surface of the building structure. The panels serve to enhance the appearance of the building and also to partially protect it from direct weathering. In one form the panels may be metal painted, stove lacquered or provided with a plastics coating which can give to the panels a desired colour or decoration appropriate to the desired exterior appearance of the building, and provide protection against atmospheric oxidation of the panels. On other occasions, it has become a practice for decorative facing material to be attached by means of a mounting system bolted or screwed to the rear surface of the panels. Such facing material may be made of stone, as with a granite facing, or of wood.

In one such cladding system the panels are attached to the exterior of the building by fixing to vertical rails disposed at regular intervals around the exterior of the building and generally extending to the height of the building. The rails are generally of angle or U-section and the panels are bent over at their vertical edges to form flanges which enter the interior of the rails. The panels generally are hooked onto transverse member straddling the U-shaped members through the provision of cut-outs on the flanges. Arrangements of such type are described in for example DE-A1-3527224, EP-A-144926 and EP-A-180837.

Whilst such assembly method is relatively quick, it gives rise to practical difficulties. Because of the underlying material and manufacturing tolerance and because the panels may not be rigidly held in position, there is scope for movement up and down and backwards and forwards of the panels, as well as some flexing of the metal thereof and these can, taken together, lead to a lack of security and considerable noise problem especially under windy conditions. Hitherto the problem has been overcome by clamping screwing, bolting or wedging the panels to the vertical rails at a sufficient number of points. This is a time consuming operation to carry out after the panels are in place.

Improvements in respect of these problems are achieved with the facade mounting arrangement of CH-A-639454. Here, the panels are mounted on bolts extending between cut-outs of adjacent flanges. These bolts have parallel flat faces which are introduced along undersize passages into a full width part of the cut-outs in the flanges where they are rotated to extend the width of the cut-out and be retained therein through being too wide to fall into the narrower undersized passage from which they have emerged. The bolts are secured against turning by means of a spring clip. This is however a cumbersome means of holding the panels and still leads to their having some freedom of movement and thus major capability of generating noise.

OBJECT OF THE INVENTION

Thus, it is an object of this invention to provide a panel or cladding fixing which is held against panel movement and noise generation when in position in a building.

BRIEF DESCRIPTION OF THE INVENTION

According to the present invention, there is provided an assembly providing panelling or cladding, the assembly comprising at least one panel and mounting means for attachment of the panels to a support structure at a predetermined location thereon, the mounting means being formed with opposed through openings with either the openings being occupied by screw-threaded rotatable members retained in the mounting means, the rotatable members having parallel flat portions disposed intermediate their ends, or the mounting means being accompanied by a plurality of such rotatable members for insertion in the openings and retention in the mounting means to be rotatable therein; the panels being provided along a pair of opposite edge regions with sheet metal flanges intended for location within the mounting means and providing free edges, each flange being formed with at least one cut-out, the cut-outs comprising dog-leg portions entering the flanges at right angles to the free edges thereof and having in a first region thereof a width at least equal to the maximum width of the rotatable members, a second region at right angles thereto and extending parallel to said free edges of the flanges, whose width is intermediate said maximum width of the rotatable member and the separation of said flat faces thereof and a third region which is circular and whose centre lies on the longitudinal axis of the second region and whose diameter is slightly less than the maximum thread diameter of the rotatable member but insufficiently small to prevent quarter turn rotation of the rotatable member when within said third region to engage the periphery of the third region by cutting thereinto.

In preferred practice each flange will be formed with at least two cut-outs and cut-outs on the opposite flanges of a panel are preferably at like positions along the length of the respective flanges.

By utilising the assembly of this invention it is possible, not only to link together adjacent panels in a simple arrangement, but to ensure that when the assembly of panels is complete, there is no possibility of movement of the panels either laterally or up and down. This results from the oversizing of the thread on the bolt with respect to the opening in the third region of the cut-out. As will be particularly apparent from the description of the accompanying drawings which follows, the rotatable member which in its simplest form is merely a modified bolt with parallel flats formed along part of the length thereof, will already be in position in the mounting means which in turn will be attached to the building structure and will be capable of rotation in the mounting means. The panels will be slid over the bolts up to the end of the first region of the cut-outs. The cut-outs will be oriented so that the flat surfaces are vertical. This will allow the panels to descend over the rotatable members until the rotatable members are located within the third region of the cut-outs. Rotation of the rotatable members through 90° will latch the panels in position as they will now be incapable of sliding off the rotatable members. Moreover, the flanges are generally formed of sheet steel or aluminium, that is relatively soft metal. The slight oversizing of the thread on the rotatable members with respect to the third region will ensure that rotation of the rotatable members causes them to cut into the periphery of the third region of the dog-leg. Preferably the bolt carries self-tapping screw-threading so as to produce a cut thread in the sheet metal, the resulting engagement being sufficient to keep the panels firmly in place, incapable of movement as aforesaid in any direction whatsoever and thereby ensuring the security of the panels and that the noise generated by the movement of the panels will be minimised.

As mentioned above the panels may be formed of sheet metal. They may be clad with facing material, e.g. stone or wood. When each facing material is required to be used it is in fact, sufficient to replace sheet metal panels by sheet metal angles members attached to panels of facing material adjacent longitudinal extending edges, the angle members providing flanges as aforesaid and formed with the aforementioned cut-outs.

BRIEF DESCRIPTION OF THE DRAWINGS

For a better understanding of the invention and to show how the same can be carried into effect, reference will now be made by way of example only to the accompanying drawings wherein.

DETAILED DESCRIPTION OF THE INVENTION

Figure 1:
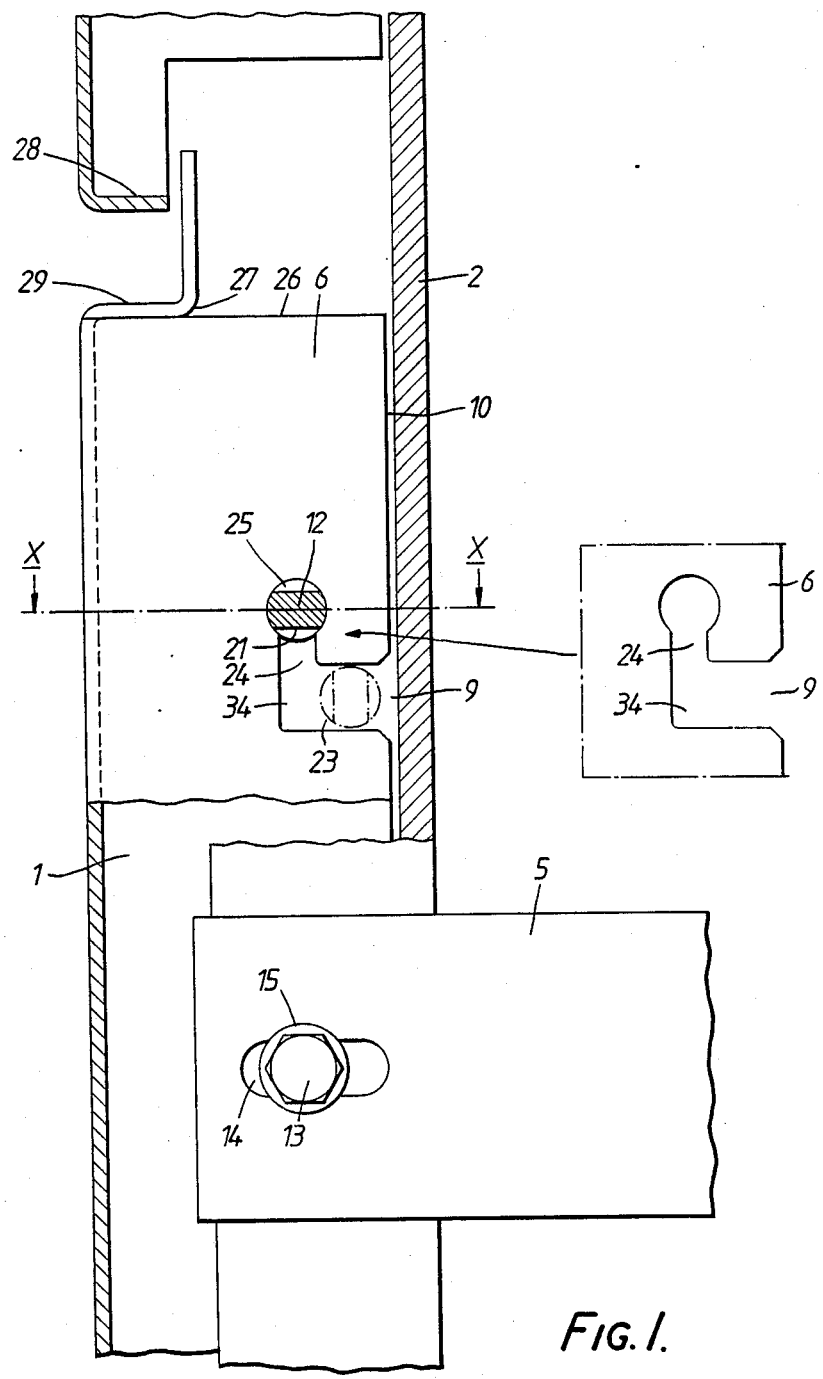
FIG. 1 is a vertical section through a mounting arrangement for rain screen panelling.

Referring to the accompanying drawings, rain screen cladding panels 1 are mounted within typical mounting members 2 on the exterior of a building structure 3 whose exterior surface is covered by a weatherproof membrane 4. The mounting members 2 are carried in the space between opposed pairs of angle supports 5 although it is pointed out that it may frequently be sufficient for the mounting members 2 to be attached directly to the surface of the building structure. The panels 1 are formed with flanges 6 extending along their vertical margins and entering the U-shaped interior 7 of the mounting members 2 which are thus in the form of rails extending the height of the area to be clad. This general mounting arrangement is most apparent from FIG. 2.

FIG. 1 of the accompanying drawings indicates more precisely how the panels 1 are attached, via the mounting members 2, to the building structure. Depending on the height of the panels, the flanges are preferably formed with at least two dog-leg cut-outs 9 extending from the free edges 10 of each of the flanges. The cut-outs 9 will normally be in pairs disposed at like positions along the length of the flanges. With panels of exceptional length, it may be desirable to provide additional intermediate cut-outs positioned adjacent the top and bottom ends of the flanges. The cut-outs themselves are intended to receive therein the shanks 11 of rotatable members 12 which are initially in place in the mounting members 2. The mounting members are attached to the angle supports 5 by means of bolts 13, entering openings 14 in the angle supports and being held in place with respect to the mounting members with interposition of spacer elements 15. The rotatable members 12 are, as can be seen from FIG. 1, vertically displaced from the bolts 13.

Figure 3:
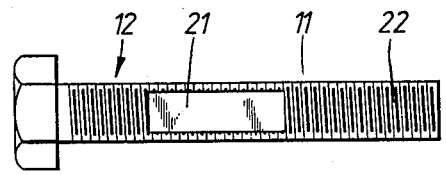
FIG. 3 shows in plan view a rotatable member for use in the assembly of FIGS. 1 and 2.

The rotatable members 12 are in the form of bolts passing through opposed openings 16a in the mounting members 2 and locked on the latter by means of nuts 16 with interposition of spacer elements 18, the parts being so sized as to allow for freedom of rotation of the members 12 within the opposed openings 19 and 20 in the mounting members 2. The rotatable members comprise parallel flats 21 along part of their length interrupting screw-threading 22 thereon (see FIG. 3). Initially, the rotatable members will be positioned with the flats substantially vertical. The dog-leg cut-outs 9 in the panels possess a first region 23 whose width is a little larger than the maximum width of the rotatable member. A second region 24 is narrower than the first region but possesses a width sufficient to accommodate the rotatable member when its flats 21 are vertical, that is its width is slightly greater than the distance between the flats. Surmounting the second region of each dog-leg cut-out 9 is a circular cut-out constituting a third region 25 of the cut-out. This has a diameter almost as great as the maximum thread diameter of the rotatable member.

Figure 2:
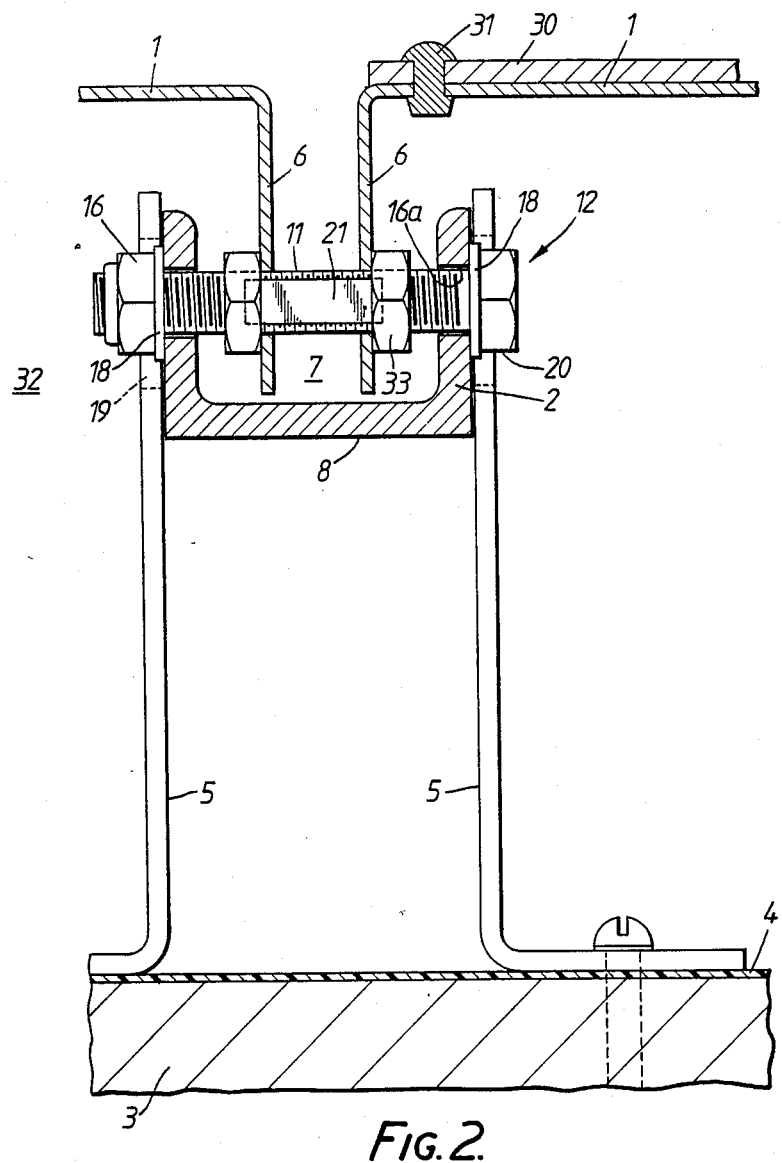
FIG. 2 is a horizontal section taken at X—X in FIG. 1.

A number of additional features shown which do not form part of the invention are shown in FIGS. 1 and 2. At its top margin 26 each panel 1 is bent over twice into an L-formation 27. As FIG. 1 shows, the bottom margin of each panel is bent over once into a portion 28 whose depth matches horizontal portion 29 of L-formation 27. This arrangement does not form part of the present invention but serves merely to provide for good abutment of the panels at their top and bottom margins to minimize ingress of rain. The right hand panel 1 is shown in FIG. 2 with stone cladding 30 attached thereto by a fixing member 31. The space 32 behind the panels 1 is optionally occupied by insulating material. Finally self locking nuts 33 placed on the rotating member 12 assists in location of the flanges thereon to achieve the required spacing apart of the panels.

The assembling of panels on a wall structure is carried out as follows. With the mounting members 2 in place as already described, the panels 1 are merely slipped over the rotatable members 2 until they contact end wall 34 of the cut-outs 9. The panels are then allowed to drop over the rotatable members, the vertical edges of the cut-outs descending parallel to the flats 21 on the rotatable members. At this stage, the panels are still capable of easy removal if required and have certain freedom of movement. However by application of spanners or like tools to the portions of the flats lying between adjacent panels 1, the rotatable members 12 may be rotated one quarter turn. This will have the effect of latching the panels onto the rotatable members. Moreover as a result of the slight oversizing of the rotatable members, their rotation will result in biting of the screw threading on the rotatable members into the relatively soft metal of the panels. This will cause the panels to be locked onto the rotatable members and incapable of any movement while thus held thereon.

The example described above and illustrated in FIGS. 1 and 2 could be modified by having the first region 23 of each cut-out 9 inclined to the horizontal (considering FIG. 1) instead of horizontal and/or by having the second region 24 of each cut-out 9 inclined to the vertical instead of vertical. The regions 23 and 24 could be curved instead of straight. Instead of the cut-outs being of dog-leg form, they could be straight or in the form of a continuous curve. The panels, or at least the flanges on them, could be of non-metallic material, for example plastics material. The member 12 could have not one but two separate zones provided with the flats 21, one to engage the flange of one panel and the other to engage the flange of the other panel. Instead of the relevant zone or zones of the members 12 having flats, they could be convex or concave on two opposite sides, provided that in the zone or zones the members 12 have a greater width in one direction than in another direction perpendicular thereto.

The above described assemblies could be used for cladding buildings or other structures with panelling which does not provide rain screen cladding. An assembly of parts 1, 2 and 12 as described above could be employed wherever it is desired to couple panels together, for example in the construction of partitioning or of desks or other fabrications from panels.

A single panel having two flanges extending in the same direction as one another from two opposite edges may be fixed to a structure by having one limb of each of at least two spaced-apart angle-pieces fixed to the structure, the other limbs of the angle-pieces projecting from the structure and being formed with holes through them through which pass the rotatable screw-threaded members as described above, which have a head on one side of the projecting limb of the angle-piece and a locking nut on the other side. The flanges of the panel, which have slots and through openings as described above, are applied to the rotatable screw-threaded members such that all the projecting limbs of the angle-pieces lie between the two flanges, and when the rotatable screw-threaded members occupy the circular through openings in the flanges, these members are given a quarter turn so that they bite into the peripheries of the circular through openings.

I claim:

1. An assembly providing panelling or cladding, the assembly comprising at least one panel and mounting means for attachment of the panels to a support structure at a predetermined location thereon, the mounting means being formed with opposed through openings, with either the openings being occupied by screw-threaded rotatable members retained in the mounting means, the rotatable members having parallel flat portions disposed intermediate their ends or the mounting means being accompanied by a plurality of such rotatable members for insertion in the openings and retention in the mounting means to be rotatable therein; the panels being provided along a pair of opposite edge regions with sheet metal flanges intended for location within the mounting means, and providing free edges, each flange being formed with at least one cut-out, the cut-outs comprising dog-leg portions entering the flanges at right angles to the free edges thereof and having in a first region thereof a width at least equal to the maximum width of the rotatable members, a second region at right angles thereto and extending parallel to said free edges of the flanges, whose width is intermediate said maximum width of the rotatable member and the separation of said flat faces thereof and a third region which is circular and whose centre lies on the longitudinal axis of the second region and whose diameter is slightly less than the maximum thread diameter of the rotatable member but insufficiently small to prevent quarter turn rotation of the rotatable member when within said third region to engage the periphery of the third region by cutting thereinto.

2. An assembly as claimed in claim 1, wherein each flange is formed with at least two said cut-outs and cut-outs on opposite flanges are aligned at like positions along the length of the respective flanges to receive a said rotatable member spanning the gap between correspondingly located openings in the mounting means.

3. An assembly as claimed in claim 1, wherein the flanges are provided by elongate sheet metal elements of right-angle profile affixed to panels of facing material adjacent longitudinally extending edges of said panels.

4. Mounted on a wall of a building, a plurality of cladding panels in an array extending vertically and horizontally over the wall, the panels being formed along a pair of opposite vertically extending edge regions with sheet metal flanges providing free edges, each flange being formed with at least one cut-out, the cut-outs comprising dog-leg portions entering the flanges at right-angles to the free edges thereof and having a first region, a second region at right-angles thereto and extending parallel to said free edges of the flanges and a third region which is circular and whose centre lies on the longitudinal axis of the second region, which flanges engage screw-threaded rotatable members retained in elongate mounting means mounted vertically on the said wall, the rotatable members having parallel flat faces disposed intermediate their ends and occupying the third region of each cut-out to lie transversely thereof with screw-threads cut into the sheet metal constituting the periphery of said third region, the first region of each cut-out having a width at least equal to the maximum width of the rotatable member, the second region having a width intermediate said maximum width and the separation of said flat faces of the rotatable member and the diameter of the third region being slightly less than the maximum thread diameter of the rotatable member but insufficiently small to prevent quarter turn rotation of the rotatable member within said third region.

5. The array of claim 4, wherein each flange is formed with at least two said cut-outs, cut-outs on opposite flanges being aligned at like positions along the length of the respective flanges and receiving a said rotatable member spanning the gaps between correspondingly located openings in the mounting means.

6. An assembly comprising two panels and coupling means coupling them together, the coupling means comprising two spaced walls formed with opposed through openings and screw-threaded rotatable members each passing through an opening in one wall and an opening in the other wall and having between the walls at least one portion which is of greater thickness in a first direction than in another direction perpendicular to the first direction, the panels comprising flanges which project between said walls, the flanges having free edges from which extend slots each of which has an outer end at one of said edges and an inner end remote from said one of the edges, the flanges having circular through openings at the inner ends of the slots, which openings are wider than the inner ends of the slots and communicate with the slots, the diameter of the circular through openings being slightly less than said greater thickness of the rotatable members but insufficiently small to prevent quarter-turn rotation of the rotatable members, when within said circular through openings, to engage the peripheries of the circular through openings by cutting into them.

7. A method of coupling together two panels, comprising forming on each panel a flange having a slot extending from a free edge of the flange, the slot having an outer end at said free edge and an inner end remote from said free edge, and forming a circular through opening at the inner end of each slot, the circular through opening being wider than the inner end of the slot and communicating with the slot, the method further comprising forming an assembly of two opposed walls each with a plurality of through openings and a plurality of rotatable screw-threaded members each passing through an opening in one wall and an opening in another wall, each of said members having between the walls at least one portion which is of greater thickness in a first direction than in another direction perpendicular to the first direction, the method further comprising causing the flanges of the two panels to project between said walls and the rotatable members to enter the slots at their outer ends and then to occupy first the inner ends of the slots and then said circular through openings and then turning each rotatable member a quarter-turn, which causes it to bite into the periphery of the circular through opening which it occupies.

8. An assembly comprising a panel and fixing means for it, the fixing means comprising a wall formed with an opening and a screw-threaded rotatable member passing through the opening and having at least one portion which is of greater thickness in a first direction than in another direction perpendicular to the first direction, the panel comprising a flange which lies near said wall, the flange having a free edge from which extends a slot which has an outer end at said edge and an inner end remote from said edge, the flange having a circular through opening at the inner end of the slot, which opening is wider than the inner end of the slot and communicates with the slot, the diameter of the circular through opening being slightly less than said greater thickness of the rotatable member but insufficiently small to prevent quarter-turn rotation of the rotatable member, when within said circular through opening, to engage the periphery of the circular through opening by cutting into it.

9. A method of fixing a panel, comprising forming on said panel a flange having a slot extending from a free edge of the flange, the slot having an outer end at said edge and an inner end remote from said edge, and forming a circular through opening at the inner end of the slot, the circular through opening being wider than the inner end of the slot and communicating with the slot, the method further comprising forming an assembly of a wall with a through opening and a rotatable screw-threaded member passing through the opening and having at least one portion which is of greater thickness in a first direction than in another direction perpendicular to the first direction, the method further comprising causing the flange of the panel to lie near said wall and the rotatable member to enter the slot at its outer end and then to occupy first the inner end of the slot and then said circular through opening and then turning the rotatable member a quarter-turn, which causes it to bite into the periphery of the circular through opening.

* * * * *